US012354620B2

(12) United States Patent
Ochiai et al.

(10) Patent No.: US 12,354,620 B2
(45) Date of Patent: Jul. 8, 2025

(54) SIGNAL PROCESSING DEVICE, SIGNAL PROCESSING METHOD, SIGNAL PROCESSING PROGRAM, LEARNING DEVICE, LEARNING METHOD, AND LEARNING PROGRAM

(71) Applicant: NIPPON TELEGRAPH AND TELEPHONE CORPORATION, Tokyo (JP)

(72) Inventors: Tsubasa Ochiai, Musashino (JP); Marc Delcroix, Musashino (JP); Yuma Koizumi, Musashino (JP); Hiroaki Ito, Musashino (JP); Keisuke Kinoshita, Musashino (JP); Shoko Araki, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 228 days.

(21) Appl. No.: 18/020,084

(22) PCT Filed: Aug. 13, 2020

(86) PCT No.: PCT/JP2020/030808
§ 371 (c)(1),
(2) Date: Feb. 7, 2023

(87) PCT Pub. No.: WO2022/034675
PCT Pub. Date: Feb. 17, 2022

(65) Prior Publication Data

US 2024/0038254 A1 Feb. 1, 2024

(51) Int. Cl.
*G10L 21/028* (2013.01)
*G10L 25/30* (2013.01)

(52) U.S. Cl.
CPC ............ *G10L 21/028* (2013.01); *G10L 25/30* (2013.01)

(58) Field of Classification Search
CPC ....... G10L 21/028; G10L 25/30; G10L 25/51; G10L 21/0272
See application file for complete search history.

(56) References Cited

U.S. PATENT DOCUMENTS

| | | | | |
|---|---|---|---|---|
| 2008/0300702 A1* | 12/2008 | Gomez | .................. | G10L 25/48 700/94 |
| 2021/0192220 A1* | 6/2021 | Qu | ....................... | G06V 10/764 |

(Continued)

FOREIGN PATENT DOCUMENTS

| | | | | | |
|---|---|---|---|---|---|
| AU | 2009278263 B2 * | 9/2012 | ......... | G10L 21/0208 |
| CN | 108615532 A * | 10/2018 | ........... | G10L 19/008 |
| WO | 2020/022055 A1 | 1/2020 | | |

OTHER PUBLICATIONS

Žmolíková et al., "SpeakerBeam: Speaker Aware Neural Network for Target Speaker Extraction in Speech Mixtures" IEEE Journal of Selected Topics in Signal Processing, vol. 13, No. 4, Available Online at: https://www.fit.vutbr.cz/research/groups/speech/publi/2019/zmolikova_IEEEjournal2019_08736286.pdf, Aug. 2019, pp. 800-814.

(Continued)

*Primary Examiner* — Oyesola C Ojo
(74) *Attorney, Agent, or Firm* — XSENSUS LLP

(57) ABSTRACT

A signal processing device includes processing circuitry configured to receive an input of extraction target information indicating which audio class of an audio signal is to be extracted from a mixture audio signal constituted by a mixture of audio signals of a plurality of audio classes, and output a result of extracting the audio signal of the audio class indicated by the extraction target information from the (Continued)

mixture audio signal, with a neural network by using a feature value of the mixture audio signal and the extraction target information.

10 Claims, 8 Drawing Sheets

(56) References Cited

U.S. PATENT DOCUMENTS

| | | | | |
|---|---|---|---|---|
| 2021/0281739 | A1* | 9/2021 | Takahashi | H04N 23/635 |
| 2022/0277040 | A1* | 9/2022 | Xu | G10H 1/36 |

OTHER PUBLICATIONS

Kavalerov et al., "Universal Sound Separation", 2019 IEEE Workshop on Applications of Signal Processing to Audio and Acoustics, Available Online at: https://arxiv.org/pdf/1905.03330.pdf, analysisarXiv: 1905.03330v2 [cs.SD], Oct. 20-23, 2019, 5 pages.

Luo et al., "Conv-TasNet: Surpassing Ideal Time-Frequency Magnitude Masking for Speech Separation", IEEE/ACM Transactions on Audio, Speech, and Language Processing, vol. 27, No. 8, Aug. 2019, pp. 1256-1266.

Ochiai et al., "Listen to What You Want: Neural Network-based Universal Sound Selector", Available Online at: https://arxiv.org/abs/2006.05712, arXiv:2006.05712v1, Jun. 10, 2020, 11 pages.

Listen to What You Want: Neural Network-based Universal Sound Selector by Tsubasa Ochiai, submitted on Jun. 10, 2020 to arxiv.org.

* cited by examiner

Fig. 6

| Method | # class for Sel. | # class in Mix. | | | mean |
|---|---|---|---|---|---|
| | | 3 | 4 | 5 | |
| Iterative | 2 | 4.4 | 6.7 | 8.0 | 6.9 |
| Simultaneous | 2 | 5.1 | 6.8 | 7.7 | 6.9 |
| Iterative | 3 | −11.0 | 2.7 | 5.2 | 2.0 |
| Simultaneous | 3 | −4.9 | 3.9 | 5.0 | 3.3 |

SIGNAL PROCESSING DEVICE, SIGNAL PROCESSING METHOD, SIGNAL PROCESSING PROGRAM, LEARNING DEVICE, LEARNING METHOD, AND LEARNING PROGRAM

CROSS-REFERENCE TO RELATED APPLICATION

The present application is based on PCT filing PCT/JP2020/030808, filed Aug. 13, 2020, the entire contents of which are incorporated herein by reference.

TECHNICAL FIELD

The present invention relates to a signal processing device, a signal processing method, a signal processing program, a learning device, a learning method, and a learning program.

BACKGROUND ART

A technology for separating a mixture audio signal constituted by a mixture of various audio classes called audio events and a technology for identifying an audio class have conventionally been proposed (1). In addition, a technology for extracting only a speech of a specific speaker from mixed audio signals constituted by a mixture of speeches of a plurality of persons has also been studied (2). For example, there are (2) a technology that uses a speech of a speaker registered in advance to extract a speech of the speaker from speech mixtures and (1) a technology for detecting an event from each of sounds separated for each sound source.

CITATION LIST

Non Patent Literature

Non Patent Literature 1: Katerina Zmolikova, et. al. "SpeakerBeam: Speaker Aware Neural Network for Target Speaker Extraction in Speech Mixtures", IEEE JOURNAL OF SELECTED TOPICS IN SIGNAL PROCESSING, VOL. 13, NO. 4, p. 800-814, [Searched on Jul. 7, 2020], Internet <URL:fit.vutbr.cz/research/groups/speech/publi/2019/zmolikova_IEEEjournal2019_08736286.pdf>

Non Patent Literature 2: Ilya Kavalerov, et. al. "UNIVERSAL SOUND SEPARATION", [Searched on Jul. 7, 2020], Internet <URL:arxiv.org/pdf/1905.03330.pdf>

SUMMARY OF INVENTION

Technical Problem

However, the technologies (1) and (2) described above lack a consideration of a technology for extracting audio signals of a plurality of audio classes desired by a user from mixed audio signals constituted by a mixture of a plurality of signals of audio classes of sounds (e.g., environmental sounds and the like) other than speeches of persons. In addition, both of the technologies (1) and (2) described above have a problem in that the larger the number of audio classes to be extracted, the larger the calculation amount. For example, in the case of the technology that uses a speech of a speaker registered in advance to extract a speech of the speaker from speech mixtures, the amount of calculation increases in proportion to the number of speakers to be extracted. In addition, in the case of the technology for detecting an event from each of sounds separated for each sound source, the amount of calculation increases in proportion to the number of events to be detected.

It is therefore an object of the present invention to extend an audio signal extraction technology, which has conventionally supported only speeches of persons, to audio signals other than speeches of persons. It is also an object of the present invention to enable extraction with a constant calculation amount without depending on the number of audio classes to be extracted when an audio signal of an audio class desired by a user is extracted from a mixture audio signal including audio signals of a plurality of audio classes.

Solution to Problem

In order to solve the previously described problems, a signal processing device including: processing circuitry configured to: receive an input of extraction target information indicating which audio class of an audio signal is to be extracted from a mixture audio signal constituted by a mixture of audio signals of a plurality of audio classes; and output a result of extracting the audio signal of the audio class indicated by the extraction target information from the mixture audio signal, with a neural network by using a feature value of the mixture audio signal and the extraction target information.

Advantageous Effects of Invention

The present invention can extend the audio signal extraction technology, which has conventionally supported only speeches of persons, to audio signals other than speeches of persons. In addition, the present invention enables extraction with a constant calculation amount without depending on the number of audio classes to be extracted when an audio signal of an audio class desired by a user is extracted from a mixture audio signal including audio signals of a plurality of audio classes.

BRIEF DESCRIPTION OF DRAWINGS

FIG. 6 is a diagram illustrating an experimental result.

DESCRIPTION OF EMBODIMENTS

Hereinafter, modes (embodiments) for carrying out the present invention will be described with reference to the drawings. Note that the present invention is not limited to the embodiments described below.

First Embodiment

[Outline] An outline of an operation of a signal processing device of a first embodiment will be described with reference to FIG. 7. The signal processing device learns a model in advance for using a neural network to extract an audio signal of a predetermined audio class (for example, keyboard, meow, telephone, or knock illustrated in FIG. 7) from a mixture audio signal (Mixture) constituted by a mixture of audio signals of a plurality of audio classes. For example, the signal processing device learns a model in advance for extracting audio signals of the audio classes of keyboard, meow, telephone, and knock. Then, the signal processing device uses the learned model to directly estimate a time domain waveform of an audio class x to be extracted with the use of, for example, a sound extraction network represented by the following Formula (1).

[Math. 1]

$$\hat{x}=DNN(y,o) \qquad \text{Formula (1)}$$

In Formula (1), y is a mixture audio signal, and o is a target class vector indicating an audio class to be extracted.

Figure 7:
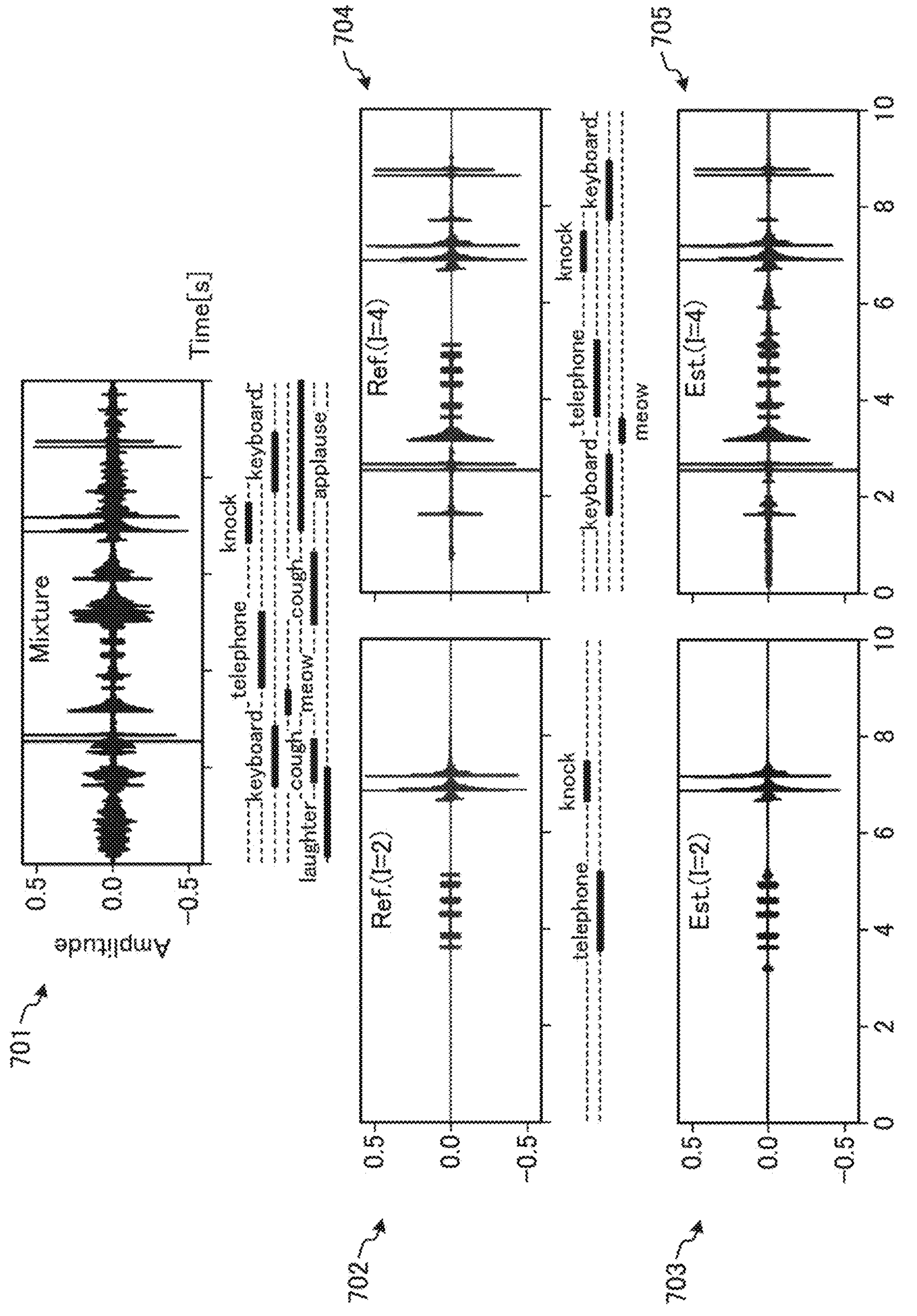
FIG. 7 is a diagram illustrating an experimental result.

For example, in a case where telephone and knock indicated by reference numeral 702 in FIG. 7 are designated as audio classes to be extracted, the signal processing device extracts a time domain waveform indicated by reference numeral 703 as a time domain waveform of telephone and knock from a mixture audio signal indicated by reference numeral 701. In addition, for example, in a case where keyboard, meow, telephone, and knock indicated by reference numeral 704 are designated as audio classes to be extracted, the signal processing device extracts, from the mixture audio signal indicated by reference numeral 701, a time domain waveform indicated by reference numeral 705 as a time domain waveform of keyboard, meow, telephone, and knock.

Such a signal processing device allows audio signal extraction, which has conventionally supported only speeches of persons, to be applied also to extraction of audio signals other than speeches of persons (for example, the audio signals of keyboard, meow, telephone, and knock described above). In addition, such a signal processing device enables extraction with a constant calculation amount without depending on the number of audio classes to be extracted when an audio signal of an audio class desired by a user is extracted from a mixture audio signal.

Figure 1:
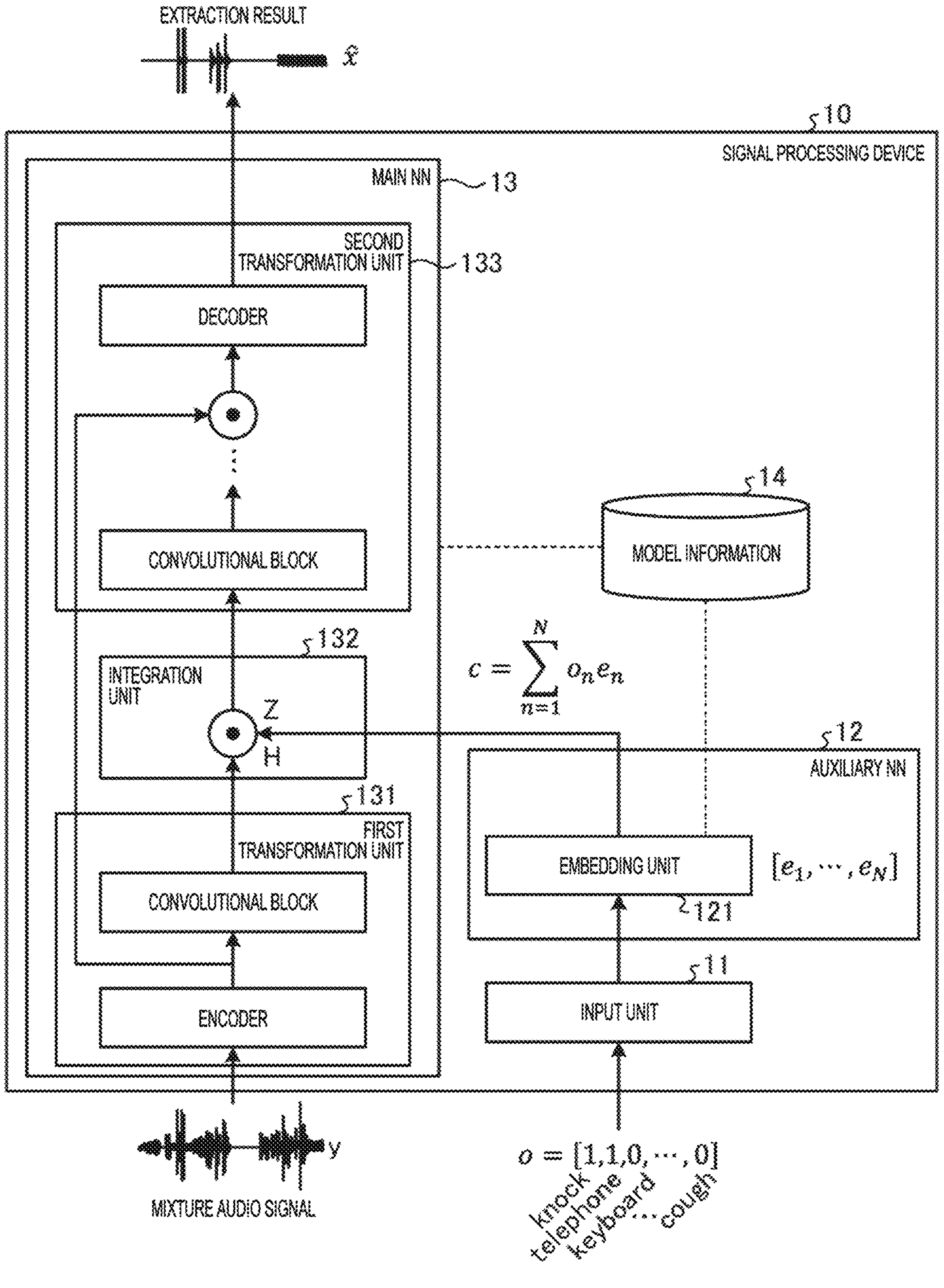
FIG. 1 is a diagram illustrating a configuration example of a signal processing device.

[Configuration example] A configuration example of a signal processing device 10 will be described with reference to FIG. 1. As illustrated in FIG. 1, the signal processing device 10 includes an input unit 11, an auxiliary NN 12, a main NN 13, and model information 14.

The input unit 11 receives an input of extraction target information indicating which audio class of an audio signal is to be extracted from a mixture audio signal constituted by a mixture of audio signals of a plurality of audio classes. The extraction target information is represented by, for example, a target class vector o indicating, by a vector, which audio class of an audio signal is to be extracted from the mixture audio signal. The target class vector o is, for example, an n-hot vector, in which an element corresponding to the audio class to be extracted is $o_n=1$ and other elements are 0. For example, the target class vector o illustrated in FIG. 1 indicates that audio signals of audio classes of knock and telephone are to be extracted.

The auxiliary NN 12 is a neural network that performs processing of embedding the target class vector o and outputs a target class embedding (c) to the main NN 13. For example, the auxiliary NN 12 includes an embedding unit 121 that performs the processing of embedding the target class vector o. The embedding unit 121 calculates, for example, the target class embedding c in which the target class vector o is embedded on the basis of the following Formula (2).

[Math. 2]

$$c = Wo = \sum_{n=1}^{N} o_n e_n \qquad \text{Formula (2)}$$

Here, $W=[e_1, \ldots, e_N]$ is a weight parameter group obtained by learning, and $e_n$ is an embedding of an n-th audio class. $W=[e_1, \ldots, e_N]$ is stored in, for example, the model information 14. Note that, in the following description, the neural network used in the auxiliary NN 12 is referred to as a first neural network.

The main NN 13 is a neural network for extracting an audio signal of an audio class to be extracted from a mixture audio signal on the basis of the target class embedding c received from the auxiliary NN 12. The model information 14 is information indicating parameters such as a weight and a bias of each neural network. Here, a specific value of the parameter in the model information 14 is, for example, information obtained by learning in advance with the use of a learning device or a learning method to be described later. The model information 14 is stored in a predetermined area of a storage device (not illustrated) of the signal processing device 10.

The main NN 13 includes a first transformation unit 131, an integration unit 132, and a second transformation unit 133.

Here, an encoder is a neural network that maps an audio signal to a predetermined feature space, that is, transforms an audio signal into a feature vector. A convolutional block is a set of layers for one-dimensional convolution, normalization, and the like. A decoder is a neural network that maps a feature value in a predetermined feature space to an audio signal space, that is, transforms a feature vector into an audio signal.

The convolutional block (1-D Conv), the encoder, and the decoder may have configurations similar to those described in Literature 1 (Y. Luo and N. Mesgarani, "Conv-TasNet: Surpassing ideal time-frequency magnitude masking for speech separation", IEEE/ACM Trans. ASLP, vol. 27, no. 8, pp. 1256-1266, 2019). The audio signal in the time domain may be obtained by a method described in Literature 1. Each feature value in the following description is represented by a vector.

The first transformation unit 131 uses a neural network to transform a mixture audio signal into a first feature value. For example, the first transformation unit 131 uses the neural network to transform the mixture audio signal into $H=\{h_1, \ldots, h_F\}$. Here, $h_f \in R^{D\times 1}$ indicates the feature in an f-th frame, F is the total number of frames, and D is the dimension of the feature space.

In the following description, the neural network used in the first transformation unit 131 is referred to as a second neural network. The second neural network is a part of the main NN 13. In the example in FIG. 1, the second neural network includes an encoder and a convolutional block. The encoder outputs an intermediate feature value of $H=\{h_1, \ldots, h_F\}$ described above to the second transformation unit 133.

The integration unit 132 integrates the feature value of the mixture audio signal (first feature value, corresponding to above H) and the target class embedding c to generate a second feature value. For example, the integration unit 132 generates the second feature value ($Z=\{z_1, \ldots, z_F\}$) by calculating, for each element, an element-wise product of the first feature value and the target class embedding c, both of which are vectors of the same number of dimensions.

Here, the integration unit 122 is provided as a layer in the neural network. As illustrated in FIG. 1, when the entire main NN 13 is viewed, the layer is inserted between a first convolutional block following the encoder and a second convolutional block.

The second transformation unit 123 uses the neural network to transform the second feature value output from the integration unit 122 into information for output (extraction result). The information for output is information corresponding to the audio signal of the designated audio class in the input speech mixtures, and may be the audio signal itself or data in a predetermined format from which the audio signal can be derived.

In the following description, the neural network used in the second transformation unit 133 is referred to as a third neural network. This neural network is also a part of the main NN 13. In the example illustrated in FIG. 1, the third neural network includes one or more convolutional blocks and a decoder.

The second transformation unit 133 obtains a result of extracting the audio signal of the audio class corresponding to the target class vector o by using the intermediate feature value of $H=\{h_1, \ldots, h_F\}$ output from the encoder of the first transformation unit 131 and the intermediate feature value output from the convolutional blocks of the second transformation unit 133.

Figure 2:
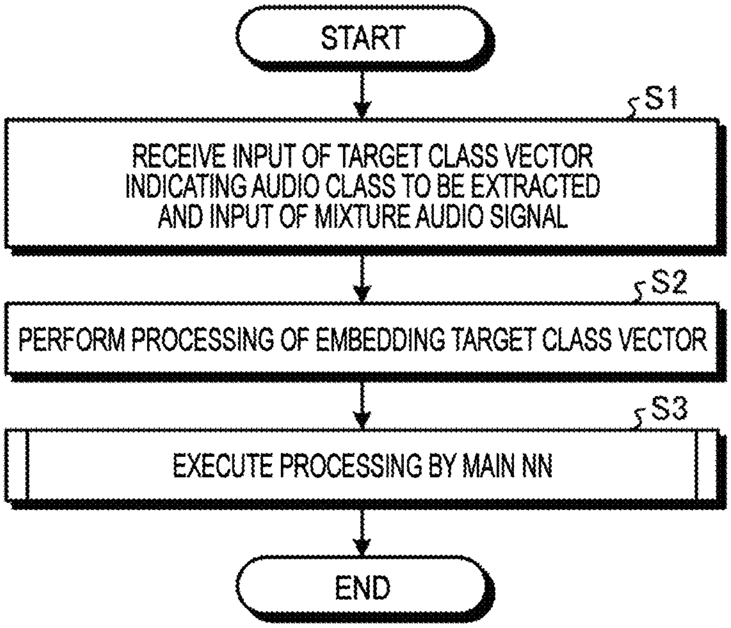
FIG. 2 is a flowchart illustrating an example of a processing procedure of the signal processing device illustrated in FIG. 1.

[Example of processing procedure] Next, an example of a processing procedure of the signal processing device 10 will be described with reference to FIG. 2. The input unit 11 of the signal processing device 10 receives an input of the target class vector o indicating the audio class to be extracted and an input of the mixture audio signal (S1). Next, the signal processing device 10 executes the auxiliary NN 12 to perform processing of embedding the target class vector o (S2). In addition, the signal processing device 10 executes processing by the main NN 13 (S3). Here, the signal processing device 10 may execute the auxiliary NN 12 and the main NN 13 in parallel. However, since the main NN 13 uses an output from the auxiliary NN 12, the execution of the main NN 12 is not completed until the execution of the auxiliary NN 13 is completed.

Figure 3:
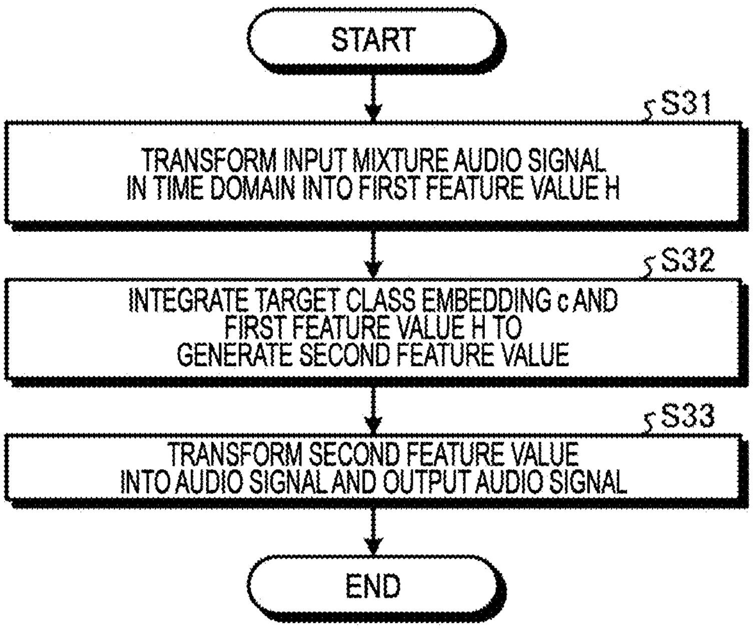
FIG. 3 is a flowchart illustrating in detail processing of S3 in FIG. 2.

Next, the processing of S3 in FIG. 2 will be described in detail with reference to FIG. 3. First, the first transformation unit 131 of the main NN 13 transforms the input mixture audio signal in the time domain into a first feature value H (S31). Next, the integration unit 132 integrates the target class embedding c generated by the processing in S2 in FIG. 4 and the first feature value H to generate a second feature value (S32). Then, the second transformation unit 133 transforms the second feature value generated in S32 into an audio signal and outputs the audio signal (S33).

According to the signal processing device 10 as described above, a user can use a target class vector o to designate an audio class to be extracted from a mixture audio signal. In addition, when extracting an audio signal of an audio class designated by a user from a mixture audio signal, the signal processing device 10 can extract the audio signal with a constant calculation amount without depending on the number of audio classes to be extracted.

[Second Embodiment] In a second embodiment, a learning device that performs learning processing for generating the model information 14 of the signal processing device 10 of the first embodiment will be described. The same configurations as those of the first embodiment are denoted by the same reference numerals, and description thereof is omitted.

Figure 4:
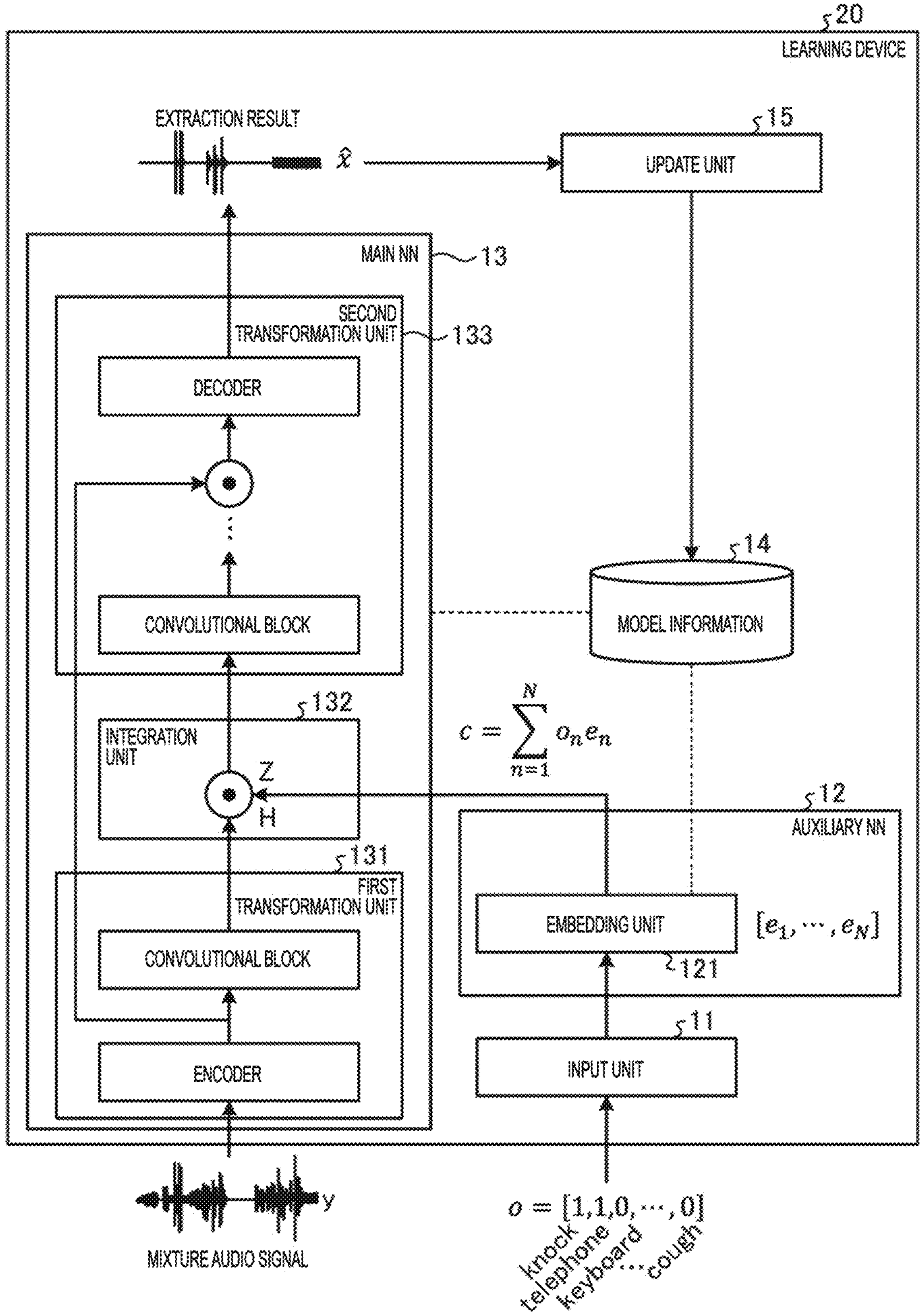
FIG. 4 is a diagram illustrating a configuration example of a learning device.

[Configuration example] As illustrated in FIG. 4, a learning device 20 executes an auxiliary NN 12 and a main NN 13 on learning data, similarly to the signal processing device 10 of the first embodiment. For example, the learning data is a mixture audio signal y, a target class vector o, and an audio signal $\{x_n\}^N_{n=1}$ ($\{y, o, \{x_n\}^N_{n=1}\}$) of an audio class corresponding to the target class vector o. Here, $x_n \in R^T$ is an audio signal corresponding to an n-th audio class.

The main NN 13 and the auxiliary NN 12 perform processing similar to that in the first embodiment. In addition, an update unit 15 updates parameters of a first neural network, a second neural network, and a third neural network so that a result of extraction of an audio signal of an audio class indicated by the target class vector o by the main NN 13 becomes closer to the audio signal of the audio class corresponding to the target class vector o.

The update unit 24 updates the parameters of the neural networks stored in the model information 25 by, for example, backpropagation.

For example, the update unit 24 dynamically generates a target class vector o (a possibility for the target class vector o that may be input by a user). For example, the update unit 15 exhaustively generates target class vectors o in which one or a plurality of elements are 1 and other elements are 0. In addition, the update unit 15 generates an audio signal of an audio class corresponding to the generated target class vector o on the basis of the following Formula (3).

[Math. 3]

$$x = \sum_{n=1}^{N} o_n x_n \qquad \text{Formula (3)}$$

Then, the update unit 15 updates the parameters of the neural networks so that a loss of x generated by the above Formula (3) is as small as possible. For example, the update unit 15 updates the parameters of the neural networks so that a loss L of a signal-to-noise ratio (SNR) represented by the following Formula (4) is optimized.

[Math. 4]

$$\mathcal{L} = 10\log_{10}\left(\frac{\|x\|^2}{\|x-\hat{x}\|^2}\right) \Leftrightarrow -10\log_{10}\left(\|x-\hat{x}\|^2\right) \qquad \text{Formula (4)}$$

Note that x^ in Formula (4) represents a result of estimation of the audio signal of the audio class to be extracted calculated from y and o. Here, a mean squared logarithmic error (mean squared error (MSE)) is used for the calculation of the loss L, but another method may be used for the calculation of the loss L.

[Example of processing procedure] Next, an example of a processing procedure of the learning device 20 will be described with reference to FIG. 5. Note that it is assumed that the mixture audio signal y and the audio signal $\{x_n\}^N_{n=1}$ corresponding to each audio class are already prepared.

Figure 5:
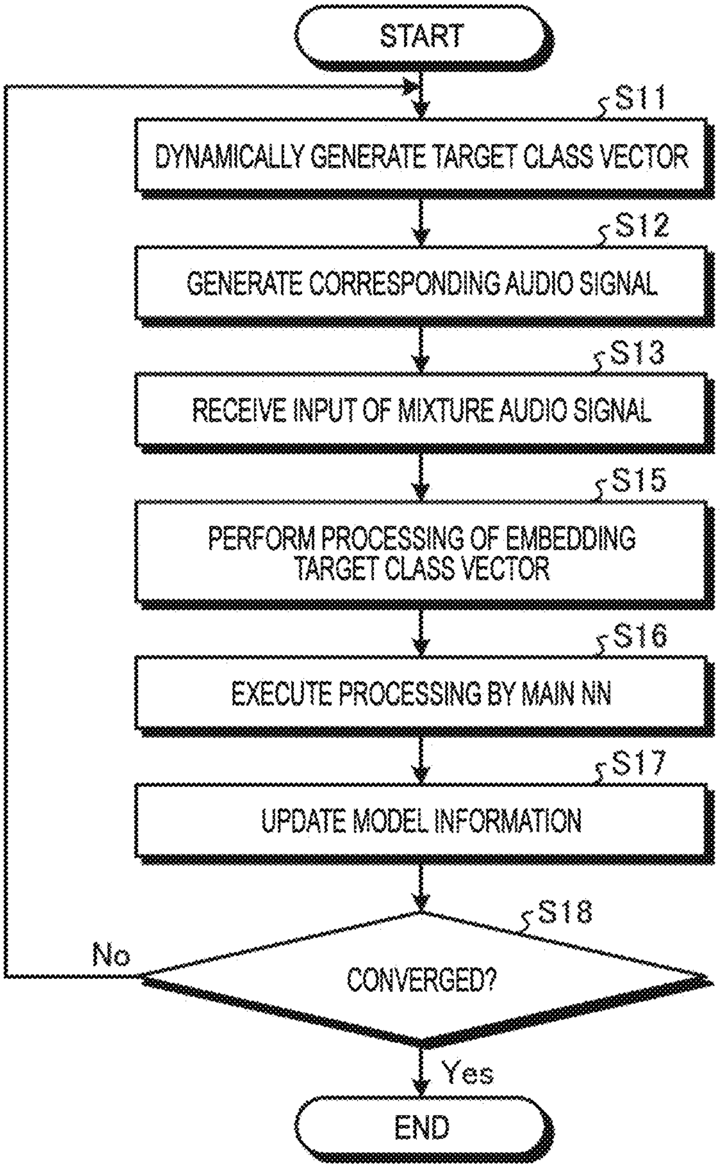
FIG. 5 is a flowchart illustrating an example of a processing procedure of the learning device in FIG. 4.

As illustrated in FIG. 5, the update unit 15 dynamically generates a target class vector (S11). Then, with the use of the audio signal $\{x_n\}^N_{n=1}$, an audio signal corresponding to the corresponding class vector generated in S11 is generated (S12). In addition, the main NN 13 receives an input of the mixture audio signal (S13).

Then, the learning device 20 executes the following processing for each of the target class vectors generated in S11. For example, the learning device 20 performs processing of embedding the target class vector generated in S11 by the auxiliary NN 12 (S15), and executes processing by the main NN 13 (S16).

Then, the update unit 15 uses a result of the processing in S16 to update the model information 14 (S17). For example, the update unit 15 updates the model information 14 so that the loss calculated by the previously described Formula (4) is optimized. Then, in a case where a predetermined condition is satisfied due to the update, the learning device 20 determines that convergence has occurred (Yes in S18), and the processing ends. On the other hand, in a case where the predetermined condition is not satisfied after the update, the learning device 20 determines that convergence has not occurred (No in S18), and the processing returns to S11. The predetermined condition described above is, for example, that the number of times of update of the model information 14 has reached a predetermined number, that the value of loss has become equal to or less than a predetermined threshold value, that a parameter update amount (e.g., a differential value of a value of loss function) has become equal to or less than a predetermined threshold value, or the like.

The learning device 20 can learn audio signals of audio classes corresponding to various target class vectors o by performing the above processing. As a result, when a target class vector o indicating the audio class to be extracted is received from a user, the main NN 13 and the auxiliary NN 12 can extract the audio signal of the audio class of the target class vector o.

[Other Embodiments] A signal processing device 10 and a learning device 20 may remove an audio signal of a designated audio class from a mixture audio signal. In this case, the signal processing device 10 and the learning device 20 may construct a sound removal network by, for example, changing the reference signal (audio signal $\{x_n\}^N_{n=1}$) of the previously described Formula (3) to a removal target audio signal $x=y-\Sigma^N_{n=1}o_n x_n$ (direct estimation method). In addition, the signal processing device 10 and the learning device 20 may use a sound selector to extract an audio signal from a mixture audio signal to reduce the mixture audio signal and generate $x=y-x^{Sel.}$ (indirect estimation method). Here, $x^{Sel.}$ represents estimation by the sound selector.

[Experimental results] Here, a result of an experiment performed to compare the technique described in the present embodiments with a conventional technique will be described.

As the signal processing device 10 and the learning device 20, a Conv-TasNet-based network architecture constituted by stacked dilated convolution blocks was adopted. In accordance with the description in Literature 2 below, hyper-parameters were set as follows. N=256, L=20, B=256, H=512, P=3, X=8, and R=4

Literature 2: Y. Luo and N. Mesgarani, "Conv-TasNet: Surpassing ideal time-frequency magnitude masking for speech separation," IEEE/ACM Transactions on Audio, Speech, and Language Processing (TASLP), vol. 27, no. 8, pp. 1256-1266, 2019.

In addition, the dimension of an embedding layer D (auxiliary NN 12) was set to 256. For an integration unit 132 (integration layer), element-wise product-based integration was adopted and inserted after a first stacked convolutional block. Furthermore, in order to optimize an initial learning rate of the signal processing device 10 and the learning device 20 to 0.0005, the Adam algorithm was adopted and gradient clipping was used. Then, the learning processing was stopped after 200 epochs.

As an evaluation measurement standard, a scale-invariant signal-to-distortion ratio (SDR) of BSSEval was used. In the experiment, evaluation was made for selection of two audio classes and three audio classes (multi-class selection). Note that three audio classes $\{n_1, n_2, n_3\}$ were determined in advance for each mixture audio signal. In addition, in a task of selecting audio classes, a reference signal for calculating the SDR was $x=\Sigma^I_{i=1}x_{ni}$, where I represents the number of target audio classes. That is, in this experiment, $I\in\{1, 2, 3\}$ holds.

In addition, a data set (Mix 3-5) obtained by mixing (Mix) three to five audio classes on the basis of the FreeSound Dataset Kaggle 2018 corpus (FSD corpus) was used as the mixture audio signal. In addition, a noise sample of the REVERB challenge corpus (REVERB) was used to add stationary background noise to the mixture audio signal. Then, six audio clips of 1.5 to 3 seconds were randomly extracted from the FSD corpus, and the extracted audio clips were added at random time positions on six-second background noise, so that a six-second mixture was generated.

For the Mix 3-5 task, a task of extracting audio signals of a plurality of audio classes was evaluated. FIG. 6 illustrates SDR improvement amounts of an Iterative extraction method and a Simultaneous extraction method. Here, the Iterative extraction method is a conventional technique in which audio classes to be extracted are extracted one by one. The Simultaneous extraction method corresponds to the technique of the present embodiments. "# class for Sel." indicates the number of audio classes to be extracted. "# class for in Mix." indicates the number of audio classes included in the mixture audio signal.

As illustrated in FIG. 6, it has been shown that Simultaneous involves less calculation cost than Iterative, but the SDR improvement amount is almost the same as that of Iterative or larger than that of Iterative. This shows that the technique of the present embodiments functions better than Iterative.

In addition, although not illustrated, an experiment of removal of a designated audio signal was conducted also in the present embodiments, and it has been shown that the SDR improvement amount was about 6 dB in both the direct estimation method and the indirect estimation method described previously.

FIG. 7 illustrates a result of an experiment on a generalization performance of the technique of the present embodiments. Here, an additional test set constituted by 200 home office-like mixtures of 10 seconds including seven audio classes was created. The target audio classes are two classes including knock and telephone (I=2) and four classes including knock, telephone, keyboard, and meow (I=4).

In FIG. 7, "Ref" indicates a reference signal, and "Est" indicates an estimation signal (extracted signal) obtained by the technique of the present embodiments. This experiment showed that, in the technique of the present embodiments, even in a case where a learning stage does not include an audio signal constituted by a mixture of the seven audio classes and simultaneous extraction of the four audio classes, the audio signals of these audio classes can be extracted without any trouble. Although not illustrated, an average value of the SRD improvement amounts of the above set was 8.5 dB in the case of the two classes, and 5.3 dB in the case of the four classes. This result suggests that the technique of the present embodiments can be generalized to a mixture audio signal including any number of audio classes and also to any number of extraction target classes.

[System configuration and others] In addition, each component of each device that has been illustrated is functionally conceptual, and is not necessarily physically configured as illustrated. That is, a specific form of distribution and integration of individual devices is not limited to the illustrated form, and all or a part thereof can be functionally or physically distributed and integrated in any unit according to various loads, usage conditions, and the like. Furthermore, the entire or any part of each processing function performed in each device can be implemented by a central processing unit (CPU) and a program analyzed and executed by the CPU, or can be implemented as hardware by wired logic.

In addition, among the individual pieces of processing described in the embodiments described above, all or some of the pieces of processing described as being automatically performed can be manually performed, or all or some of the pieces of processing described as being manually performed can be automatically performed by a known method. In addition, the processing procedures, the control procedures, the specific names, and the information including various types of data and parameters described and illustrated in the document and the drawings can be optionally changed unless otherwise specified.

[Program] The signal processing device 10 and the learning device 20 described previously can be implemented by installing the above-described program as package software or online software on a desired computer. For example, it is possible to cause an information processing apparatus to function as the signal processing device 10 and the learning device 20 by causing the information processing apparatus to execute the signal processing program described above. The information processing apparatus mentioned here includes a desktop or laptop personal computer. In addition, the information processing apparatus includes a mobile communication terminal such as a smartphone, a mobile phone, or a personal handyphone system (PHS), and also includes a slate terminal such as a personal digital assistant (PDA).

In addition, the signal processing device 10 and the learning device 20 can also be implemented as a server device that sets a terminal device used by a user as a client and provides a service related to the above processing to the client. In this case, the server device may be implemented as a Web server, or may be implemented as a cloud that provides an outsourced service related to the above processing.

Figure 8:
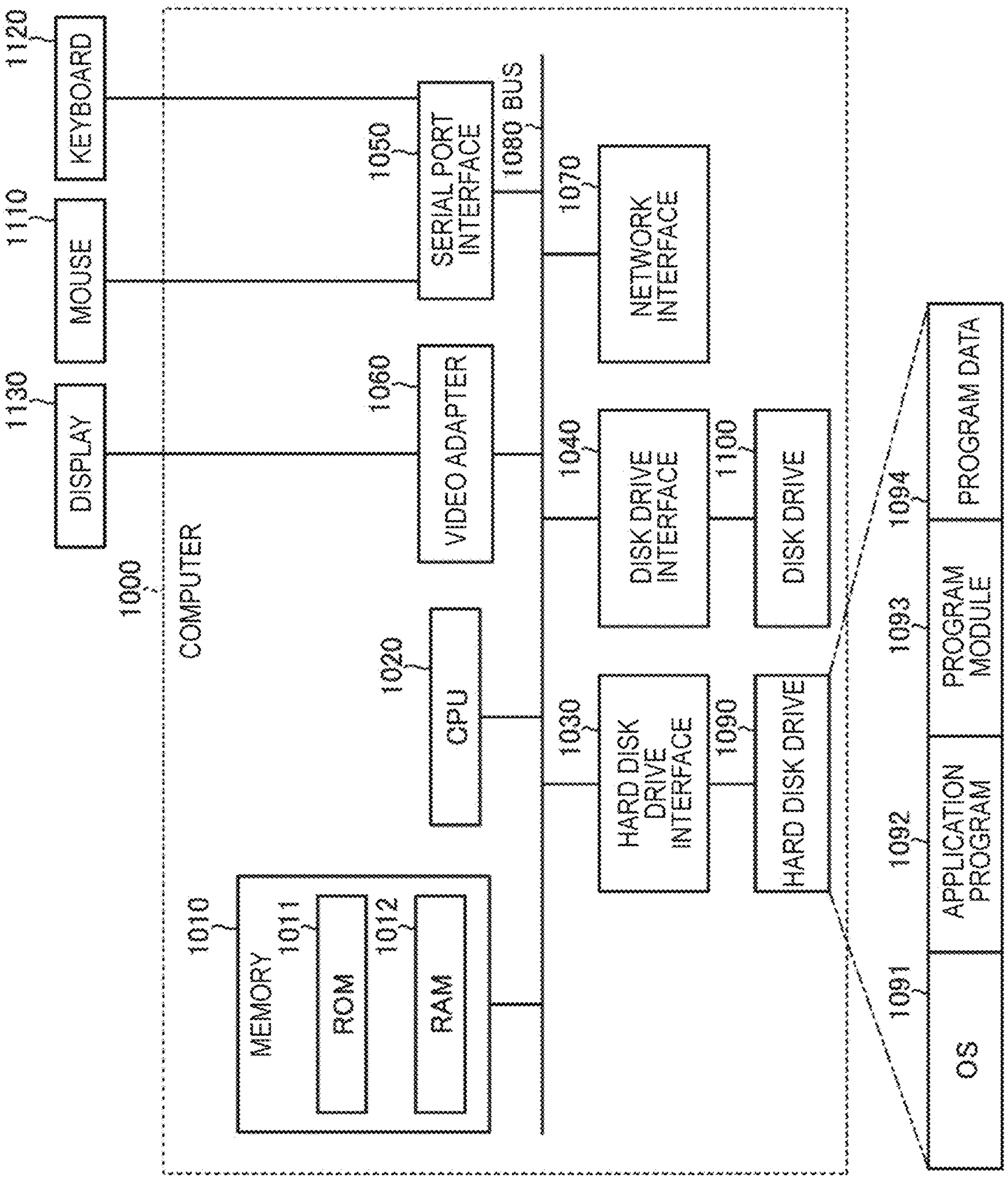
FIG. 8 is a diagram illustrating a configuration example of a computer that executes a program.

FIG. 8 is a diagram illustrating an example of a computer that executes the program. A computer 1000 includes, for example, a memory 1010 and a CPU 1020. The computer 1000 also includes a hard disk drive interface 1030, a disk drive interface 1040, a serial port interface 1050, a video adapter 1060, and a network interface 1070. These units are connected by a bus 1080.

The memory 1010 includes a read only memory (ROM) 1011 and a RAM 1012. The ROM 1011 stores, for example, a boot program such as a basic input output system (BIOS). The hard disk drive interface 1030 is connected to a hard disk drive 1090. The disk drive interface 1040 is connected to a disk drive 1100. For example, a removable storage medium such as a magnetic disk or an optical disk is inserted into the disk drive 1100. The serial port interface 1050 is connected to, for example, a mouse 1110 and a keyboard 1120. The video adapter 1060 is connected to, for example, a display 1130.

The hard disk drive 1090 stores, for example, an OS 1091, an application program 1092, a program module 1093, and program data 1094. That is, the program that defines processing by the signal processing device 10 and processing by the learning device 20 is implemented as the program module 1093 in which a code executable by a computer is described. The program module 1093 is stored in, for example, the hard disk drive 1090. For example, the program module 1093 for executing processing similar to the functional configurations in the signal processing device 10 is stored in the hard disk drive 1090. The hard disk drive 1090 may be replaced with an SSD.

In addition, setting data used in the processing of the above-described embodiments is stored, for example, in the memory 1010 or the hard disk drive 1090 as the program data 1094. Then, the CPU 1020 reads the program module 1093 and the program data 1094 stored in the memory 1010 and the hard disk drive 1090 to the RAM 1012 as necessary and executes them.

Note that the program module 1093 and the program data 1094 are not limited to being stored in the hard disk drive 1090, and may be stored in, for example, a detachable storage medium and read by the CPU 1020 via the disk drive 1100 or the like. Alternatively, the program module 1093 and the program data 1094 may be stored in another computer connected via a network (local area network (LAN), wide area network (WAN), or the like). Then, the program module 1093 and the program data 1094 may be read by the CPU 1020 from the other computer via the network interface 1070.

REFERENCE SIGNS LIST

10 Signal processing device
11 Input unit
12 Auxiliary NN
13 Main NN
14 Model information
15 Update unit
20 Learning device
131 First transformation unit
132 Integration unit
133 Second transformation unit

The invention claimed is:

1. A signal processing device comprising:
processing circuitry configured to:
receive an input of extraction target information indicating which audio class of an audio signal is to be extracted from a mixture audio signal constituted by a mixture of audio signals of a plurality of audio classes;
integrate information of the mixture audio signal and the extraction target information; and
output a result of extracting the audio signal of the audio class indicated by the extraction target information from the mixture audio signal with a neural network by using a result of the integration of the information of the mixture audio signal and the extraction target information.

2. The signal processing device according to claim 1, wherein
the extraction target information is a target class vector indicating, by a vector, which audio class of the audio signal is to be extracted from the mixture audio signal,
the processing circuitry is further configured to
perform processing of embedding the target class vector by using a neural network, and output a result of extracting the audio signal of the audio class indicated by the target class vector from the mixture audio signal with the neural network by using a feature value obtained by integrating a feature value of the mixture audio signal and the target class vector after the embedding processing.

3. The signal processing device according to claim 1, wherein the processing circuitry is further configured to
receive an input of a target class vector indicating, by a vector, which audio class of the audio signal is to be removed from the mixture audio signal, and
output a result of removing the audio signal of the audio class indicated by the target class vector from the mixture audio signal with the neural network by using a feature value obtained by integrating the target class vector after an embedding processing to a feature value of the mixture audio signal.

4. A signal processing method executed by a signal processing device, the signal processing method comprising:
receiving an input of extraction target information indicating which audio class of an audio signal is to be extracted from a mixture audio signal constituted by a mixture of audio signals of a plurality of audio classes;
integrate information of the mixture audio signal and the extraction target information; and
outputting a result of extracting the audio signal of the audio class indicated by the extraction target information from the mixture audio signal with a neural network by using a result of the integration of the information of the mixture audio signal and the extraction target information.

5. A non-transitory computer-readable recording medium storing therein a signal processing program that causes a computer to execute a process comprising:
receiving an input of extraction target information indicating which audio class of an audio signal is to be extracted from a mixture audio signal constituted by a mixture of audio signals of a plurality of audio classes;
integrating information of the mixture audio signal and the extraction target information; and
outputting a result of extracting the audio signal of the audio class indicated by the extraction target information from the mixture audio signal with a neural network by using a result of the integration of the information of the mixture audio signal and the extraction target information.

6. The signal processing device according to claim 1, wherein
the information of the mixture audio signal includes a feature value of the mixture audio signal, and
the processing circuitry is configured to:
obtain a feature value by integrating the feature value of the mixture audio signal and the extraction target information; and
output a result of extracting the audio signal of the audio class indicated by the extraction target information from the mixture audio signal with the neural network by using the feature value obtained by the integrating and the feature value of the mixture audio signal.

7. The signal processing device according to claim 1, wherein the processing circuitry is configured to perform processing of embedding the extraction target information by using a neural network.

8. The signal processing device according to claim 1, wherein
the extraction target information is a target class vector indicating, by a vector, which audio class of the audio signal is to be extracted from the mixture audio signal,
the processing circuitry is further configured to perform processing of embedding the target class vector by using a neural network.

9. The signal processing device according to claim 1, wherein the processing circuitry is configured to output the result of extracting the audio signal of the audio class indicated by the extraction target information from the mixture audio signal with the neural network by using the result of the integration and an intermediate feature value of the mixture audio signal.

10. The signal processing device according to claim 1, wherein the processing circuitry is configured to output the result of extracting the audio signal of the audio class indicated by the extraction target information from the mixture audio signal with the neural network by using an intermediate feature value derived based on the result of the integration and the intermediate feature value of the mixture audio signal.

* * * * *